United States Patent
Dubois-Ferriere

(10) Patent No.: US 8,804,521 B1
(45) Date of Patent: Aug. 12, 2014

(54) QUALITY OF SERVICE FOR INBOUND NETWORK TRAFFIC FLOWS DURING SLOW-START PHASES

(75) Inventor: Henri Dubois-Ferriere, San Francisco, CA (US)

(73) Assignee: Riverbed Technology, Inc., San Francisco, CA (US)

( * ) Notice: Subject to any disclaimer, the term of this patent is extended or adjusted under 35 U.S.C. 154(b) by 181 days.

(21) Appl. No.: 13/453,731

(22) Filed: Apr. 23, 2012

(51) Int. Cl.
H04L 12/26 (2006.01)
H04L 12/56 (2006.01)

(52) U.S. Cl.
CPC ............... *H04L 47/10* (2013.01); *H04L 47/193* (2013.01)
USPC ........................................................ 370/235

(58) Field of Classification Search
None
See application file for complete search history.

(56) References Cited

U.S. PATENT DOCUMENTS 7,359,325 B1 * 4/2008 Lewis et al. ................. 370/230.1
2009/0028050 A1 * 1/2009 Winter .......................... 370/236

* cited by examiner

*Primary Examiner* — Kevin C Harper
(74) *Attorney, Agent, or Firm* — Park, Vaughan, Fleming & Dowler LLP

(57) ABSTRACT

An edge network device controls the quality-of-service of incoming network traffic flows by limiting the bandwidth of incoming network traffic flows to create a network traffic bottleneck at the edge network device. The bottleneck ensures that this edge network device may control the quality-of-service of incoming network traffic flows. During a slow-start phase of a network traffic flow, the edge network device adds phantom network packets to a scheduler queue in addition to the actual packets of the network traffic flow. Phantom packets occupy transmission slots during packet scheduling and are discarded when selected for transmission. This limits the rate that actual packets are received and acknowledged by the destination knowledge, thereby preventing the network traffic flow source from increasing the flow bandwidth above the limit of the inbound network connection.

21 Claims, 6 Drawing Sheets

QUALITY OF SERVICE FOR INBOUND NETWORK TRAFFIC FLOWS DURING SLOW-START PHASES

CROSS-REFERENCE TO RELATED APPLICATIONS

This application is related to U.S. patent application Ser. No. 13/074,923, filed Apr. 12, 2011, and entitled "Quality of Service for Inbound Network Traffic Flows," which is incorporated by reference herein for all purposes.

BACKGROUND

This disclosure relates to the field of network devices and to systems and methods for allocating network bandwidth between multiple network traffic flows. Any set of related packets is referred to as a network traffic flow. A network traffic flow may include all of the packets associated with a specific source and/or destination device, group of devices, or category of devices. A network traffic flow may include all of the packets associated with a specific application, type of application, or type of data. A network traffic flow may include all of the packets associated with a specific network protocol, network address, network port, or a group of network addresses and/or network ports. A network traffic flow may also include any combination of packets associated as described above and/or according to any arbitrary criteria.

Edge network devices are network devices that connect a local-area network (LAN) to a wide-area network (WAN), such as the internet. Example edge network devices include network routers, switches, gateways, firewalls, and WAN optimization devices. Edge network devices may handle packets generated by and directed to large numbers of source and destination devices over the same interface.

If the bandwidth limit of a WAN, edge network device, and/or any other intervening network device is reached or exceeded by network traffic flows, packets may be delayed or dropped. Depending on the type of data being communicated over the network, these traffic disruptions may adversely affect the performance of applications on a client network. For example, clients receiving voice or streaming video data may be adversely affected by even small delays or losses of packets.

Because of the limits on network device bandwidth, many edge network devices include quality of service (QoS) functionality and implement QoS policies enabled by this functionality. QoS functionality enables network devices to prioritize between different network traffic classes and flows in allocating bandwidth. QoS policies allow network administrators to provide different priorities for different network traffic classes and flows based on factors such as the associated source, destination, user, application, or data type.

A network device that is a bottleneck or point of congestion for network traffic flows is a natural place to implement QoS. By acting as a point of congestion for network traffic flows, the network device effectively controls the rate of all network traffic flows that pass through it. For example, with outgoing network traffic flows, where the network traffic flow originates at the LAN and passes through an edge network device to a WAN, an edge network device is a natural bottleneck, because the bandwidth of the WAN is much less than that of the LAN.

In some applications, it is useful to implement QoS in a network device that is not a bottleneck. It is straightforward to move a bottleneck "upstream" of an existing bottleneck, where "upstream" means in the direction of the greater bandwidth.

However, for incoming network traffic flows, where the network traffic flow passes from a WAN through an edge network device to a LAN on its way to destination devices, the edge network device may not be the bottleneck for these traffic flows. For example, one or more upstream network devices, such as other edge network devices transferring network traffic flows from their source devices to the WAN or network devices operating inside the WAN, may operate as network traffic bottlenecks. Additionally, some communications protocols, such as TCP, include a slow-start congestion control phase during which the sender transmits data at a rate that is a multiple of the rate allocated to the network traffic flow. This slow-start congestion control phase undermines the ability of downstream edge network devices to act as network traffic flow bottlenecks and conform incoming network traffic flows to their desired QoS.

SUMMARY

Embodiments of the invention control the control the quality-of-service of incoming network traffic flows using an edge network device by limiting the bandwidth of incoming network traffic flows to slightly less than the maximum bandwidth of the incoming network connection. Additionally, embodiments of the invention detect TCP network traffic flows in a slow-start phase and further limit their allocated network bandwidth. This shifts the network bottleneck to the destination edge network device for incoming slow-start network traffic flows. By avoiding a network bottleneck and associated queue buildup at an upstream network device, the destination edge network device becomes the sole point of control for all incoming network traffic flows. This enables the destination edge network device to control the quality-of-service of the TCP network traffic flows as well as network traffic flows using other protocols.

In an embodiment, the edge network device adds phantom network packets to a scheduler queue in addition to the actual packets of the network traffic flow when the flow is in a slow-start phase. Phantom packets occupy transmission slots during packet scheduling and are discarded when selected for transmission. This limits the rate that actual packets are received and acknowledged by the destination edge network device, thereby preventing the network traffic flow source from increasing the flow bandwidth above the limit of the inbound network connection, as typical TCP slow-start phases are prone to do.

BRIEF DESCRIPTION OF THE DRAWINGS

Some embodiments of the invention will be described with reference to the drawings, in which.

DETAILED DESCRIPTION

Embodiments of the invention control the quality-of-service of incoming network traffic flows using an edge network device by limiting the bandwidth of incoming network traffic flows to less than the maximum bandwidth of the incoming WAN connection. By limiting the bandwidth of incoming network traffic flows to less than the maximum bandwidth of the incoming WAN connection, the edge network device acts as a bottleneck for incoming network traffic flows. Additionally, this avoids creating a network bottleneck and associated queue bottleneck at the upstream network device. This allows the destination edge network device to become the sole point of control for all incoming network traffic flows and enables the destination edge network device to control the quality-of-service of the TCP network traffic flows as well as network traffic flows using other protocols. To maximize throughput, the edge network device typically limits its incoming network traffic flow bandwidth to slightly less than the maximum bandwidth of the incoming WAN connection, such as 98% of the bandwidth of the incoming WAN connection.

However, TCP and some other types of network protocols increase network traffic for new network connections at greater than the maximum data rate of the network connection to maximize the rate of data transmission. The slow-start phase used for new TCP protocol connections is one example use of increased data rates for new network connections. During TCP slow-start, a sender may send two new network packets for every acknowledged network packet; this enables the sender to send packets at up to twice the bottleneck bandwidth during slow-start. Unfortunately, these increased data rate phases can increase a network traffic flow's bandwidth well above the bandwidth of a WAN connection between two or more LANs. As a result, the upstream edge network device closer to the connection source becomes the bottleneck for this network traffic flow. Because the increased data rate phase shifts the network traffic bottleneck from a downstream edge network device to the upstream edge network device, the downstream edge network device can no longer control the quality-of-service of incoming network traffic.

Embodiments of the invention detect slow-start or other increased data rate phases of network flows and modify the scheduling and bandwidth allocation to these flows to moderate these effects and shift the network traffic flow bottleneck back to the destination edge network device. It should be noted that embodiments of the invention do not disable the slow-start phase of an upstream network device. Instead, embodiments of the invention scale down the data rate used by an upstream network device during a slow-start phase so that the network traffic flow bottleneck is at the destination edge network device. The enables the destination edge network device to control the quality-of-service of incoming network traffic.

Figure 1:
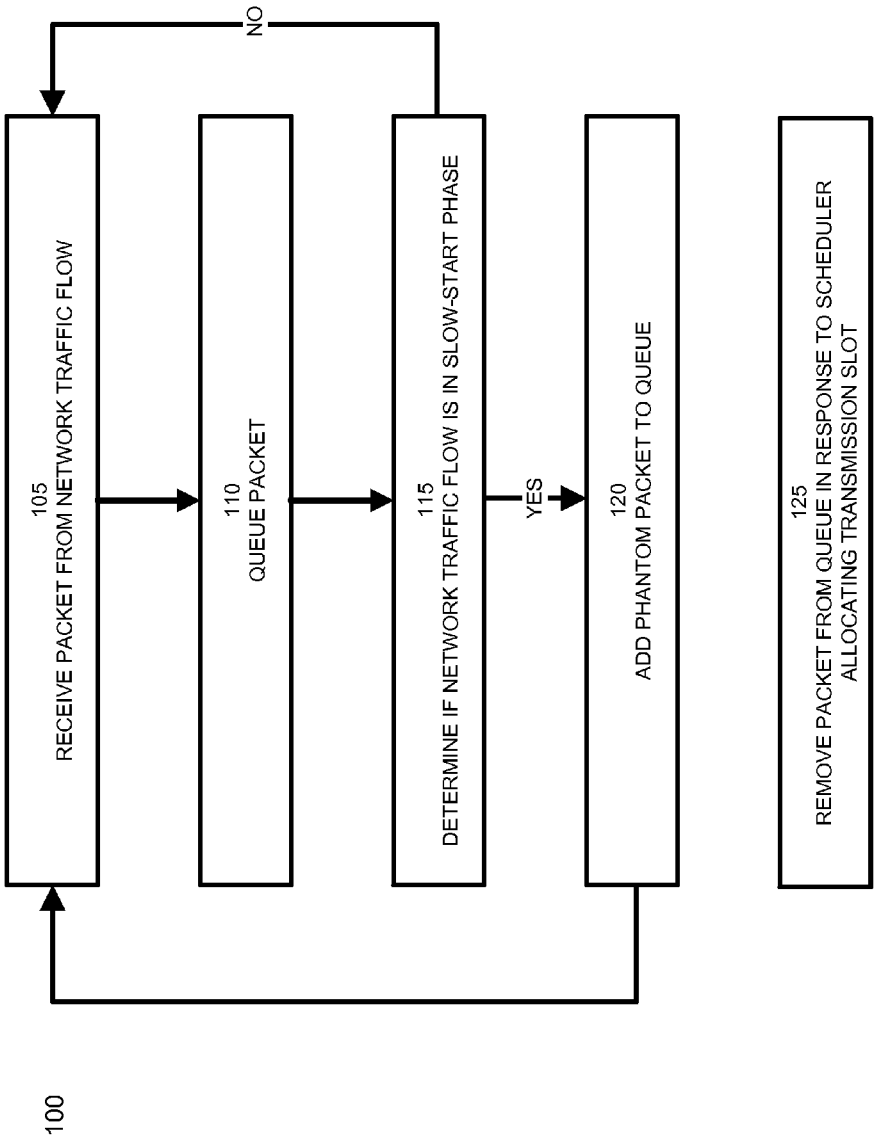
FIG. 1 illustrates a method of controlling the quality-of-service of incoming network traffic flows during a slow-start phase using an edge network device according to an embodiment of the invention.

FIG. 1 illustrates a method 100 of controlling the quality-of-service of incoming network traffic flows during a slow-start phase using an edge network device according to an embodiment of the invention. Step 105 receives a packet at a destination edge network device. The destination edge network device is connected between one or more upstream networks and one or more destination LANs. The packet is received from one or more upstream networks, including a wide-area network, a metropolitan-area network, a service provider's access network, and/or one or more local-area networks associated with sources of incoming network traffic. In general, upstream networks are any networks through which incoming network traffic passes prior to reaching the destination edge network device and the destination LAN.

Step 110 queues the received network packet in one of a plurality of queues used by a network packet scheduler in the destination edge network device. Embodiments of the invention may be used with any type of network traffic scheduling scheme known in the art, including fair-queuing, weighted fair queuing, round-robin) and/or hierarchical queuing schemes, such as hierarchical fair service curve scheduling or class-based weighted fair queuing.

In an embodiment, step 110 may assign the received network packet to a queue based on a quality-of-service class or profile. Embodiments of the invention may associate network packets to quality-of-service classes based on a source and/or destination network address and/or network port or any group thereof; network protocol; application or application type; packet payload data or data type; an associated network traffic flow; and/or any combination these attributes and/or any arbitrary criteria. Similarly, a packet may be identified as part of a network traffic flow based on a common source and/or destination device, group of devices, or category of devices; a common application, type of application, or type of data; an association with a specific network protocol, network address, network port, or a group of network addresses and/or network ports; and/or any combination these attributes and/or any arbitrary criteria.

Step 115 determines if the received network packet is part of a network traffic flow that is in a slow-start phase or another phase, such as a congestion avoidance phase that typically is used in TCP network traffic flows following the end of the slow-start phase. Embodiments of the invention may determine if the network traffic flow including the received network packet is in a slow-start phase using any technique known in the art.

In one embodiment, method 100 assumes that any new network traffic flow is in slow-start phase until at least one packet from that flow is dropped. In an implementation of this embodiment, a destination edge network device maintains a list of one or more previously received packet sequence numbers associated with each active network traffic flow. By comparing the sequence number of the received network packet with previously received packet sequence numbers, step 115 can detect if there has been any upstream packet loss. For example, a network packet having a sequence number less than or equal to a previously received sequence number indicates that a previous network packet has been lost. If this has occurred, this embodiment of step 115 assumes that the slow-phase of the associated network traffic flow has ended. In another example, an embodiment of step 115 may analyze attributes such as round-trip time (RTT) and bandwidth to determine if the network traffic flow is in the slow-start phase. If this embodiment of step 115 does not detect any packet loss, then step 115 assumes that the network traffic flow is still in a slow-start phase.

In another embodiment, step 115 tracks the time elapsed between the receipt of the first packet and the most recent packet associated with the network traffic flow. Step 115 then compares this elapsed time with an estimated time limit for the slow-start phase. If the elapsed time exceeds this time limit, then step 115 assumes that the slow-start phase of the associated network traffic flow has ended. Otherwise, step 115 assumes that the network traffic flow is still in a slow-start phase. The time limit used by this embodiment of step 115 may be predetermined, for example 10 seconds, or estimated for each new network traffic flow based on factors such as connection bandwidth, round-trip-time, and/or latency.

Further embodiments of step 115 may combine aspects of both of the above embodiments, for example by assuming new network traffic flows start in a slow-start phase until either a packet loss is detected or a time period has elapsed.

If step 115 determines that the network traffic flow associated with the received network packet is in a slow-start phase, then method 100 proceeds to step 120. Conversely, if step 115 determines that the network traffic flow associated with the received network packet is not in a slow-start phase, method 100 proceeds to step 105.

Step 120 adds one or more phantom network packets to the same scheduler queue including the received network packet. These phantom packets act as placeholders during the scheduling of queued network packets. Although phantom packets are not actually transmitted, the bandwidth and transmission time allocated to these phantom packets by the scheduler are not reassigned to any other traffic classes. From the perspective of the packet scheduler, phantom packets make it appear that the network traffic flow is consuming more bandwidth than it is actually consuming at a given time.

In an embodiment, step 120 adds one phantom packet to the scheduler queue for each actual network packet received that is associated with a network traffic flow in a slow-start phase. In other embodiments, step 120 adds phantom packets to the scheduler queue in other ratios, such as two phantom packets for every three actual packets received. In general, the rate that packets including phantom packets and actual network packets are added to the scheduler queue is proportional to the rate that the network traffic flow increases in the slow-start phase. For example, step 120 may add phantom packets at the same rate, half the rate, double the rate, or any other arbitrary multiple of the rate. The length of each phantom packet may be fixed, or in a further embodiment, step 120 may vary the size of each phantom packet in addition to or instead of the number of phantom packets added to the queue. In this embodiment, the length of phantom packets may be based on a function of attributes of one or more previously received network packets.

Following steps 120 or 115, method 100 returns to step 105 to receive additional network packets. Asynchronously and in parallel with steps 105 to 115 of method 100, step 125 receives an indication from a packet scheduler that the queue including at least the received network packet has been allocated a transmission slot. In response to this indication, step 125 selects the next packet in the queue, if any, for transmission. The selected packet may be the most recently received network packet, a previously received and queued network packet, such as the oldest network packet in this queue, or a previously queued phantom packet. Step 125 removes the selected packet from the queue. If the selected packet is a phantom packet, it is discarded. If the selected network packet is an actual network packet previously received and queued, step 125 forwards this network packet on towards its destination.

Embodiments of the step 125 may receive an indication from any type of network traffic scheduler known in the art, including fair-queuing, weighted fair queuing, round-robin) schedulers and/or hierarchical queuing schedulers, such as hierarchical fair service curve schedulers or class-based weighted fair queuing schedulers. In an embodiment, the destination edge network device typically limits the total output bandwidth from the scheduler to slightly less than the maximum bandwidth of the incoming WAN connection, such as 98% of the bandwidth of the incoming WAN connection. This, in conjunction with method 100, has the effect of shifting the network traffic bottleneck to the destination edge network device, so that this device can control the quality-of-service of incoming network traffic flows.

Although the above embodiment of method 100 is applied to a single network traffic flow, further embodiments of method 100 may be applied to multiple network traffic flows simultaneously, with each network traffic flow having a separate queue to hold incoming network packets and optionally phantom packets as specified by method 100.

Figure 2A:
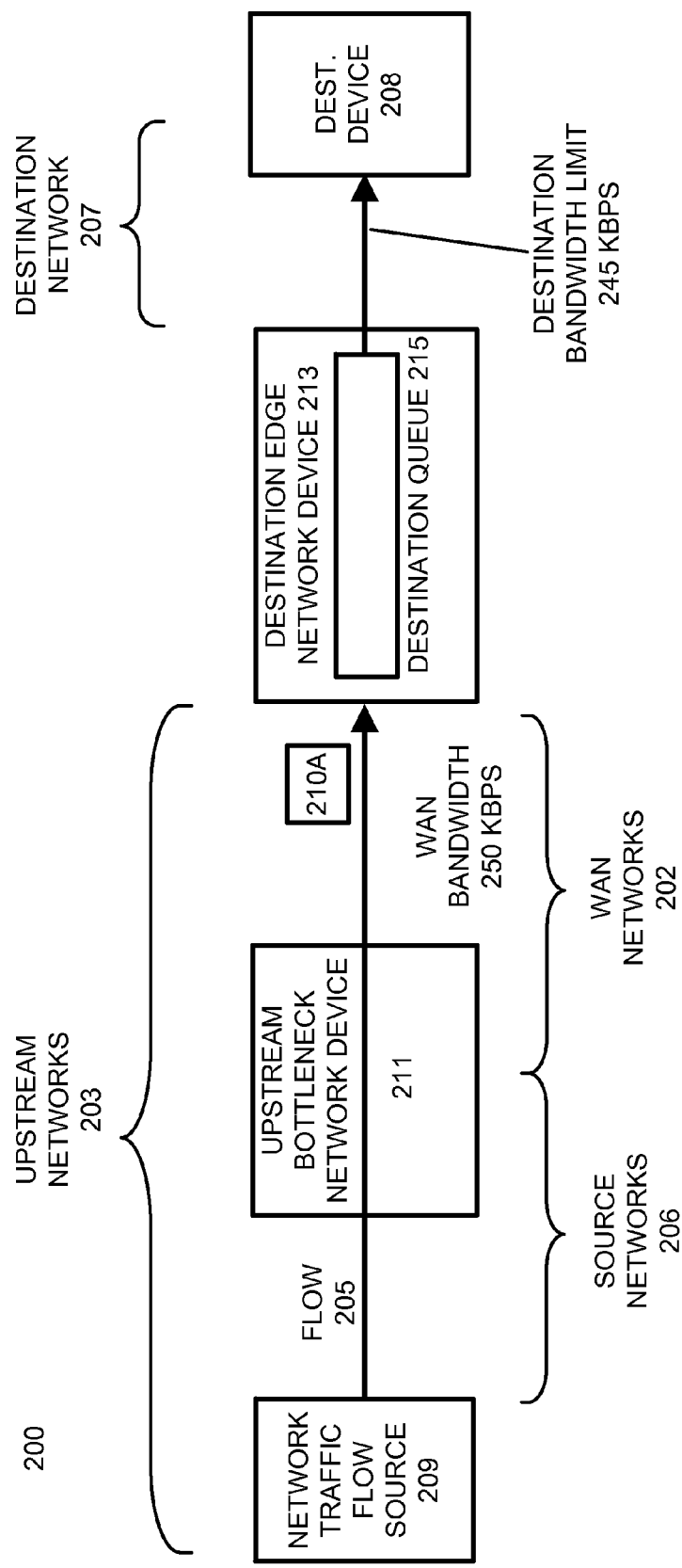
FIGS. 2A-2D illustrate an example application of the method of controlling the quality-of-service of incoming network traffic flows during a slow-start phase using an edge network device according to an embodiment of the invention.

FIGS. 2A-2D illustrate an example application of the method of controlling the quality-of-service of incoming network traffic flows during a slow-start phase using an edge network device according to an embodiment of the invention. FIG. 2A illustrates a first part 200 of an example of the beginning of a network traffic flow in a slow-start phase. Upstream networks 203 are connected with a destination network 207 through a destination edge network device 213. Upstream networks 203 can include a wide-area network and/or a service provider's access network 202, and/or one or more local-area networks 206 associated with sources of incoming network traffic. In general, upstream networks 203 are any networks through which incoming network traffic passes prior to reaching a destination network 207. In this example, a network traffic flow 205 originates from network traffic flow source 209 and travels via upstream networks 203 through a source network 206, an upstream bottleneck network device 211, and wide-area network WAN 202 to destination edge network device 213. The upstream bottleneck network device 211 may be any type network device that would potentially act as an upstream bottleneck during a slow-start phase of the network traffic flow 205. Upstream bottleneck network device 211 may be located within the source networks 206, the WAN networks 202, or any other network carrying flow 205.

In these examples, the network traffic flow 205 uses TCP, though embodiments of the invention may be applied to other types of network protocols that include similar slow-start behaviors. In example 200, a first network packet 210A in network traffic flow 205 is sent by network traffic flow source 209 to a destination device 208 in destination network 207. Network packet 210A is intercepted by destination edge network device 213.

Figure 2B:
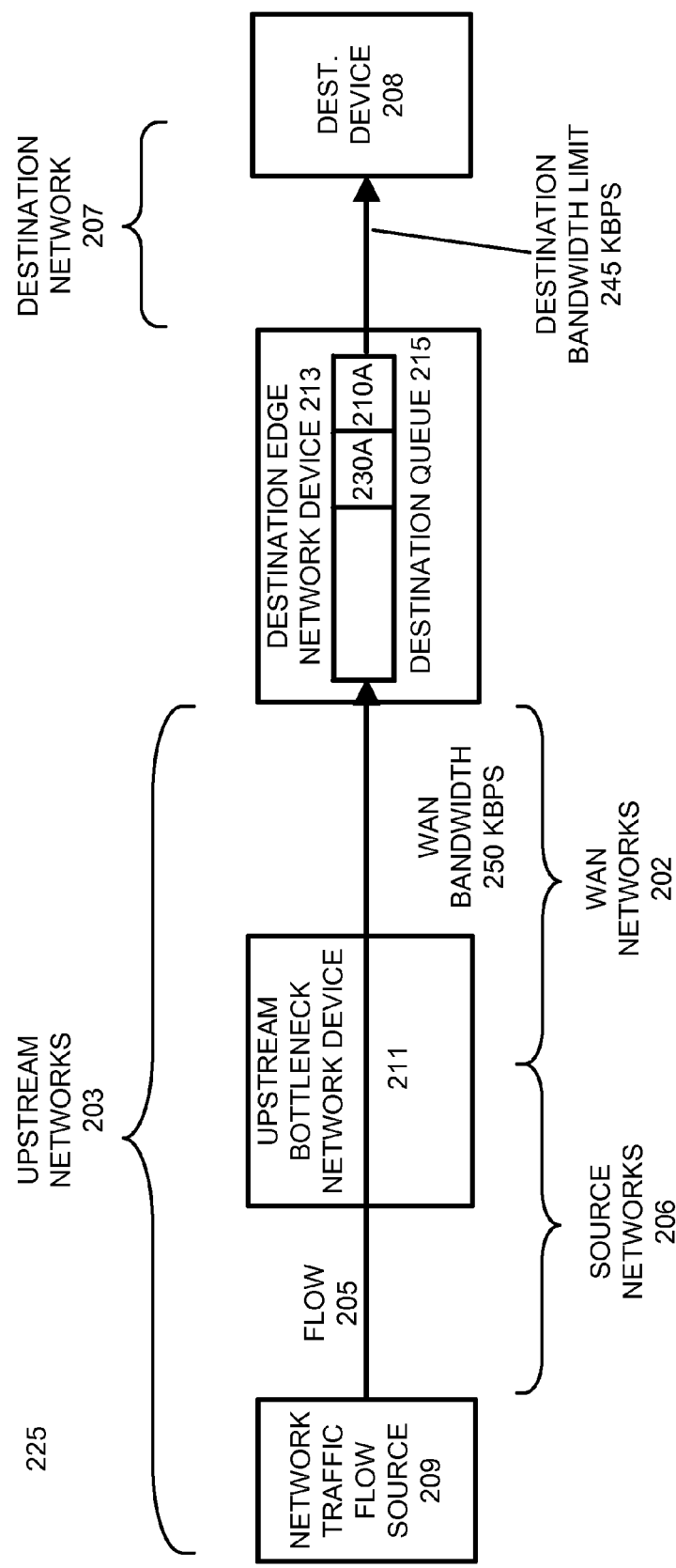

FIG. 2B illustrates a second part 225 of the example. Upon receiving the network packet 210A, the destination edge network device 213 processes this network packet according to method 100. Network packet 210A is added to a destination queue 215. Additionally, because network traffic flow 205 is in a slow-start phase, a phantom packet 230A is also added to the destination queue 215. Embodiments of the destination edge network device 213 may include multiple queues for simultaneously handling multiple network traffic flows in slow-start or other phases, such as congestion control phases. However, these additional network traffic flows and their respective queues have been omitted from this example for clarity.

Figure 2C:
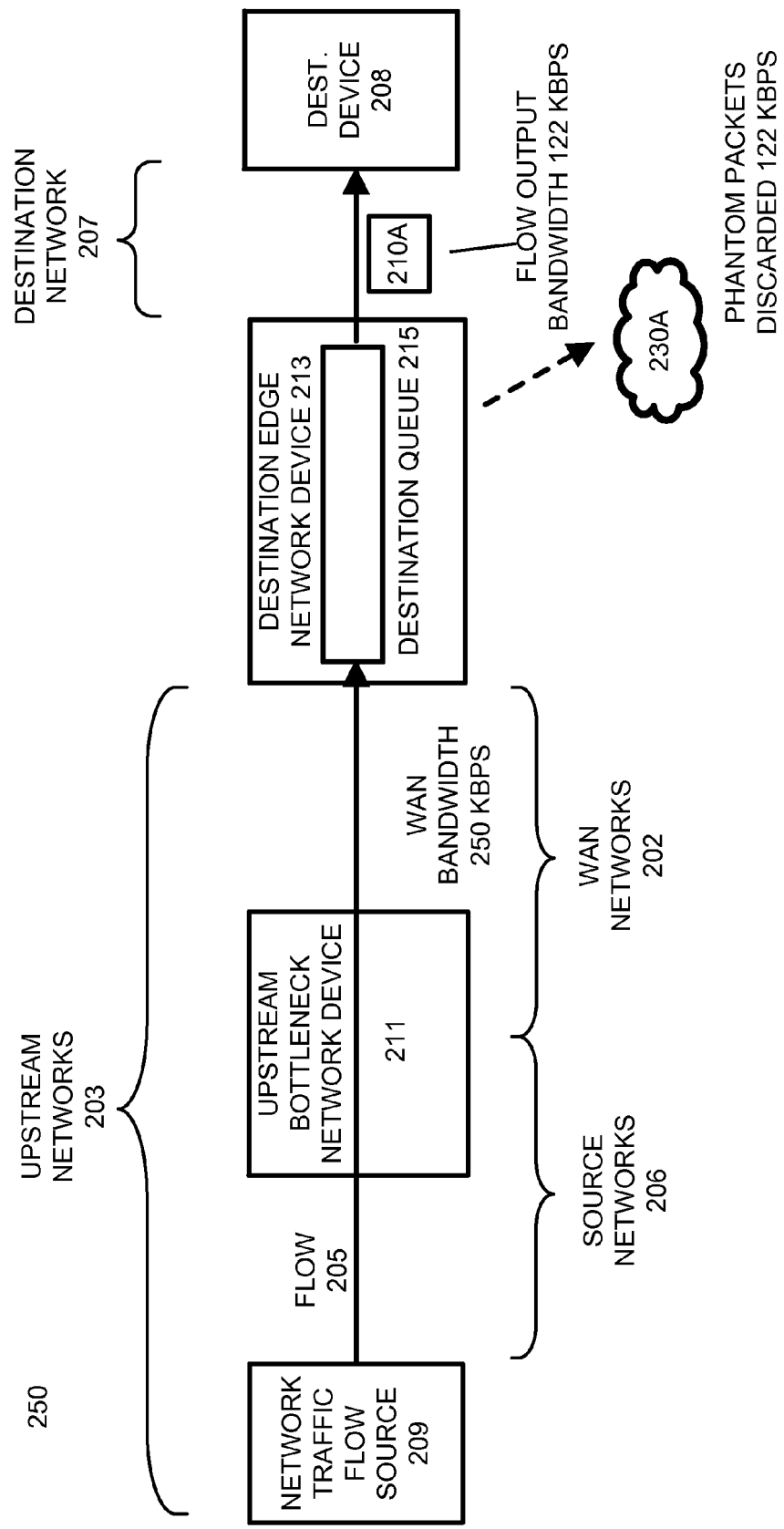

FIG. 2C illustrates a third part 250 of the example. As described in step 125 above, a packet scheduler selects queued packets from destination queue 215. In this example, the packet scheduler allocates a first transmission slot to the network traffic flow 205. In response to this allocation, the queued network packet 210A is selected, removed from destination queue 215, and forward through destination network 207 to its intended destination device 208. The packet scheduler may then allocate subsequent transmission slots to other network traffic flows and/or wait until the bandwidth limit allows for another transmission slot to be allocated to the network traffic flow 205. At some later time, the packet scheduler allocates a second transmission slot to the network traffic flow 205. In response to this allocation, the phantom packet 230A is selected, removed from destination queue 215, and, because it is a phantom packet, discarded.

As described above, the destination edge network device 213 typically limits the total output bandwidth from the scheduler to slightly less than the maximum bandwidth of the incoming WAN connection. In this example, the WAN 202 has an incoming network bandwidth of 250 Kbps and the destination edge network device 213 has a total output bandwidth of 245 Kbps. Because the addition of phantom packets, in this example, doubles the number of network packets in destination queue 215, phantom packets 230 and actual network packets 210 split the total output bandwidth. Thus, in this example, phantom packets 230 are discarded at a rate of 122.5 Kbps. Similarly, actual network packets 210 associated with the network traffic flow 205 are output from destination edge network device 213 at a rate of 122.5 Kbps.

Figure 2D:
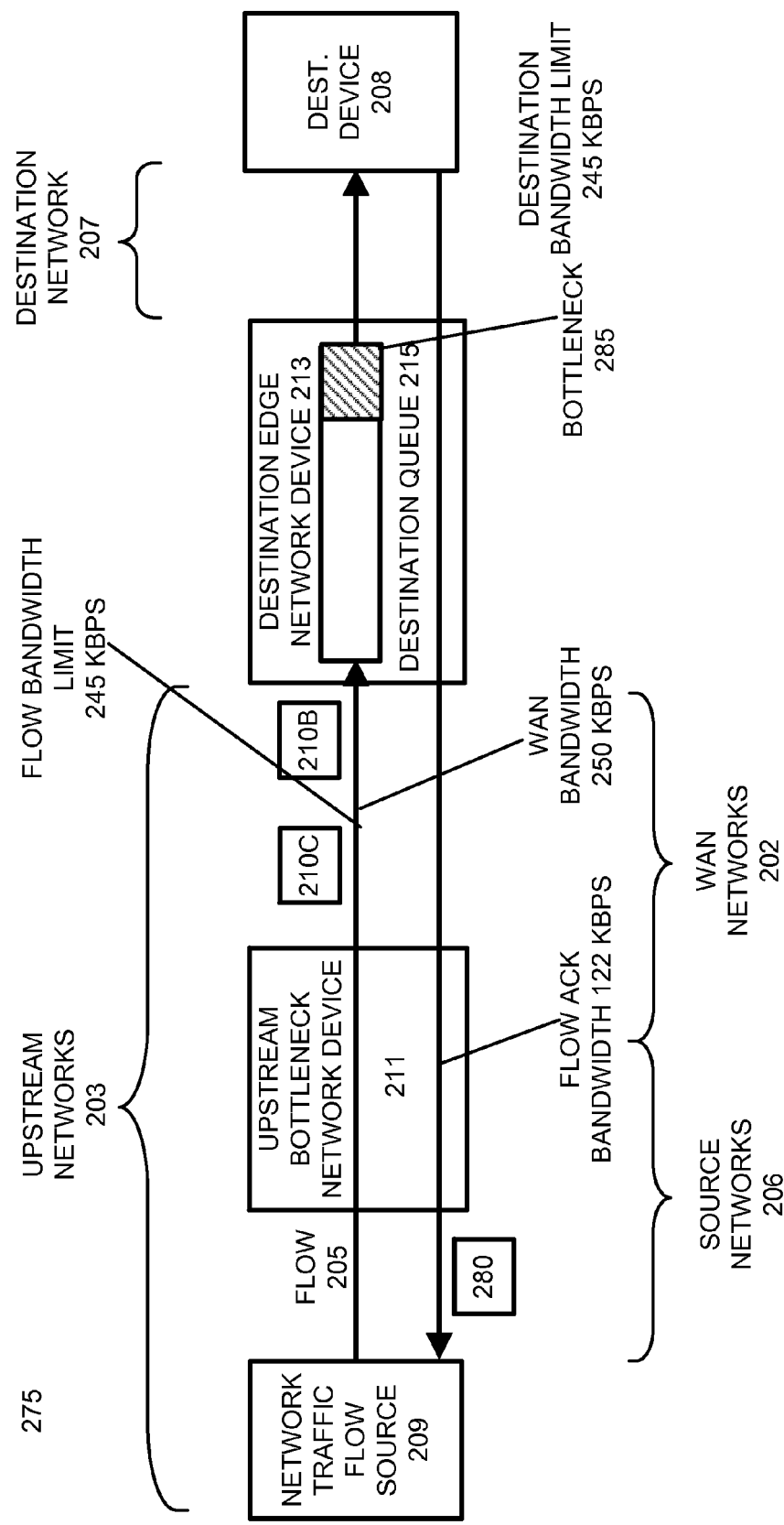

FIG. 2D illustrates a fourth part of the example. When a network packet is successfully received by the destination network device, the destination network device sends an acknowledgement (ACK) message 280 back to the network traffic flow source 209. During a TCP slow-phase, the network traffic flow source 209 sends two network packets for each acknowledgement message received. Thus, in response to receiving acknowledgement message 280, the network traffic flow source 209 sends two additional network packets 210B and 210C to the destination device 208.

Because actual network packets are output by the destination edge network device 213 at a rate of 122.5 Kbps, acknowledgement messages are returned to the network traffic flow source 209 at a rate corresponding to, at most, an incoming traffic rate of 122.5 Kbps. Thus, the network traffic flow source 209 in the TCP slow-start phase will send new network packets in network traffic flow 205 at a rate of, at most, 245 Kbps. Because this rate is less than the bandwidth limit of the WAN 202, network traffic flow 205 will not have any bottlenecks in upstream bottleneck network device 211. Conversely, because the destination edge network device 213 receives network packets network traffic flow 205 at a rate of 245 Kbps and outputs actual network packets from this flow at a rate of 122.5 Kbps, there will be a network traffic bottleneck 285 at the destination edge network device 213. This bottleneck 285 enables the destination edge network device 213 to control the quality-of-service of this incoming network traffic flow 205.

Figure 3:
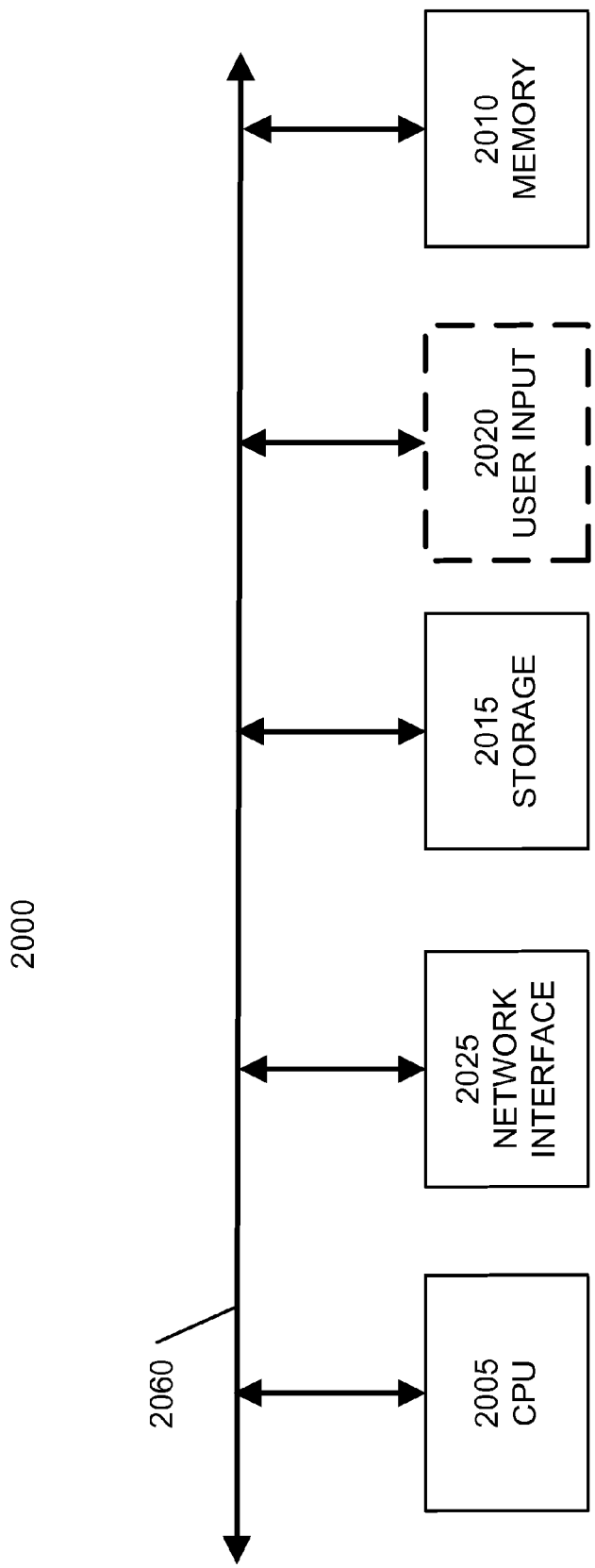
FIG. 3 illustrates a computer system suitable for implementing embodiments of the invention.

FIG. 3 illustrates a computer system suitable for implementing embodiments of the invention. FIG. 3 is a block diagram of a computer system 2000, such as a personal computer or other digital device, suitable for practicing an embodiment of the invention. Embodiments of computer system 2000 may include dedicated networking devices, such as wireless access points, network switches, hubs, routers, hardware firewalls, WAN and LAN network traffic optimizers and accelerators, network attached storage devices, storage array network interfaces, and combinations thereof.

Computer system 2000 includes a central processing unit (CPU) 2005 for running software applications and optionally an operating system. CPU 2005 may be comprised of one or more processing cores. Memory 2010 stores applications and data for use by the CPU 2005. Examples of memory 2010 include dynamic and static random access memory. Storage 2015 provides non-volatile storage for applications and data and may include computer-readable media such as fixed or removable hard disk drives, flash memory devices, ROM memory, and CD-ROM, DVD-ROM, Blu-ray, HD-DVD, or other magnetic, optical, or solid state storage devices.

In a further embodiment, CPU 2005 may execute virtual machine software applications to create one or more virtual processors capable of executing additional software applications and optional additional operating systems. Virtual machine applications can include interpreters, recompilers, and just-in-time compilers to assist in executing software applications within virtual machines. Additionally, one or more CPUs 2005 or associated processing cores can include virtualization specific hardware, such as additional register sets, memory address manipulation hardware, additional virtualization-specific processor instructions, and virtual machine state maintenance and migration hardware.

Optional user input devices 2020 communicate user inputs from one or more users to the computer system 2000, examples of which may include keyboards, mice, joysticks, digitizer tablets, touch pads, touch screens, still or video cameras, and/or microphones. In an embodiment, user input devices may be omitted and computer system 2000 may present a user interface to a user over a network, for example using a web page or network management protocol and network management software applications.

Computer system 2000 includes one or more network interfaces 2025 that allow computer system 2000 to communicate with other computer systems via an electronic communications network, and may include wired or wireless communication over local area networks and wide area networks such as the Internet. Computer system 2000 may support a variety of networking protocols at one or more levels of abstraction. For example, computer system may support networking protocols at one or more layers of the seven layer OSI network model. An embodiment of network interface 2025 includes one or more wireless network interfaces adapted to communicate with wireless clients and with other wireless networking devices using radio waves, for example using the 802.11 family of protocols, such as 802.11a, 802.11b, 802.11g, and 802.11n.

An embodiment of the computer system 2000 may also include one or more wired networking interfaces, such as one or more Ethernet connections to communicate with other networking devices via local or wide-area networks.

The components of computer system 2000, including CPU 2005, memory 2010, data storage 2015, user input devices 2020, and network interface 2025 are connected via one or more data buses 2060. Additionally, some or all of the components of computer system 2000, including CPU 2005, memory 2010, data storage 2015, user input devices 2020, and network interface 2025 may be integrated together into one or more integrated circuits or integrated circuit packages. Furthermore, some or all of the components of computer system 2000 may be implemented as application specific integrated circuits (ASICS) and/or programmable logic.

Further embodiments can be envisioned to one of ordinary skill in the art. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of controlling incoming network traffic to a network device, the method comprising:
    receiving at least a first network packet associated with a first network traffic flow;
    adding at least the first network packet to a packet scheduler queue associated with at least the first network traffic flow;
    determining if the first network traffic flow is operating in a slow-start phase; and in response to the determination that the first network traffic flow is operating in the slow-start phase, adding a phantom network packet to the packet scheduler queue.

2. The method of claim 1, comprising
selecting at least one network packet in the packet scheduler queue in response to a network packet scheduler;
determining if the selected network packet is the phantom network packet;
in response to the determination that the selected packet is a previously queued phantom network packet, discarding the selected network packet; and
in response to the determination that the selected packet is not a previously queued network packet, directing the first network packet towards its destination.

3. The method of claim 2, wherein the first network packet is received via a first network connection having a maximum incoming bandwidth and the network packet scheduler selects network packets from the packet scheduler queue at a maximum outgoing bandwidth less than the maximum incoming network bandwidth.

4. The method of claim 2, wherein selecting the at least one network packet, determining if the selected network packet is the phantom network packet, and discarding or directing the selected network packet are performed asynchronously and in parallel with adding the first network packet to the packet scheduler queue.

5. The method of claim 1, wherein adding the phantom network packet to the packet scheduler queue comprises:
inhibiting the addition of the phantom network packet to the packet scheduler queue unless at least one additional network packet has been added to the packet scheduler queue.

6. The method of claim 1, wherein the phantom packet has a fixed and predetermined length.

7. The method of claim 1, wherein the phantom packet has a length based on a function of at least the length of the first network packet.

8. The method of claim 1, wherein determining if the first network traffic flow is operating in the slow-start phase comprises:
determining if any previously sent network packets associated with the first network traffic flow has been lost; and
in response to the determination that the previously sent network packets associated with the network traffic flow have not been lost, specifying that the first network traffic flow is operating in the slow-start phase.

9. The method of claim 1, wherein determining if the first network traffic flow is operating in the slow-start phase comprises:
determining if a predetermined time period from the start of the first network traffic flow has elapsed; and
in response to the determination that the predetermined time period from the start of the first network traffic flow has not elapsed, specifying that the first network traffic flow is operating in the slow-start phase.

10. The method of claim 1, wherein determining if the first network traffic flow is operating in the slow-start phase comprises:
determining if a time period has elapsed based on a function of at least one attribute of the first network traffic flow; and
in response to the determination that the time period has not elapsed, specifying that the first network traffic flow is operating in the slow-start phase.

11. The method of claim 10, wherein the attribute of the first network traffic flow includes a bandwidth of the first network traffic flow.

12. The method of claim 10, wherein the attribute of the first network traffic flow includes a round-trip time attribute of the first network traffic flow.

13. The method of claim 1, wherein the first network traffic flow includes a TCP traffic flow.

14. A non-transitory computer-readable storage medium including instructions adapted to direct a processor to perform an operation, the operation comprising:
receiving at least a first network packet associated with a first network traffic flow;
adding at least the first network packet to a packet scheduler queue associated with at least the first network traffic flow;
determining if the first network traffic flow is operating in a slow-start phase; and
in response to the determination that the first network traffic flow is operating in the slow-start phase, adding a phantom network packet to the packet scheduler queue.

15. The non-transitory computer-readable medium of claim 14, comprising
selecting at least one network packet in the packet scheduler queue in response to a network packet scheduler;
determining if the selected network packet is the phantom network packet;
in response to the determination that the selected packet is a previously queued phantom network packet, discarding the selected network packet; and
in response to the determination that the selected packet is not a previously queued network packet, directing the first network packet towards its destination.

16. The non-transitory computer-readable medium of claim 15, wherein the first network packet is received via a first network connection having a maximum incoming bandwidth and the network packet scheduler selects network packets from the packet scheduler queue at a maximum outgoing bandwidth less than the maximum incoming network bandwidth.

17. The non-transitory computer-readable medium of claim 15, wherein selecting the at least one network packet, determining if the selected network packet is the phantom network packet, and discarding or directing the selected network packet are performed asynchronously and in parallel with adding the first network packet to the packet scheduler queue.

18. The non-transitory computer-readable medium of claim 14, wherein adding the phantom network packet to the packet scheduler queue comprises:
inhibiting the addition of the phantom network packet to the packet scheduler queue unless at least one additional network packet has been added to the packet scheduler queue.

19. The non-transitory computer-readable medium of claim 14, wherein determining if the first network traffic flow is operating in the slow-start phase comprises:
determining if any previously sent network packets associated with the first network traffic flow has been lost; and
in response to the determination that the previously sent network packets associated with the network traffic flow have not been lost, specifying that the first network traffic flow is operating in the slow-start phase.

20. The non-transitory computer-readable medium of claim 14, wherein determining if the first network traffic flow is operating in the slow-start phase comprises:

determining if a predetermined time period from the start of the first network traffic flow has elapsed; and in response to the determination that the predetermined time period from the start of the first network traffic flow has not elapsed, specifying that the first network traffic flow is operating in the slow-start phase.

21. The non-transitory computer-readable medium of claim 14, wherein the first network traffic flow includes a TCP traffic flow.

\* \* \* \* \*